Jan. 16, 1934. F. J. HINDERLITER Re. 19,047
CASING HEAD WITH BLOW-OUT PREVENTER
Original Filed March 30, 1932 2 Sheets-Sheet 1
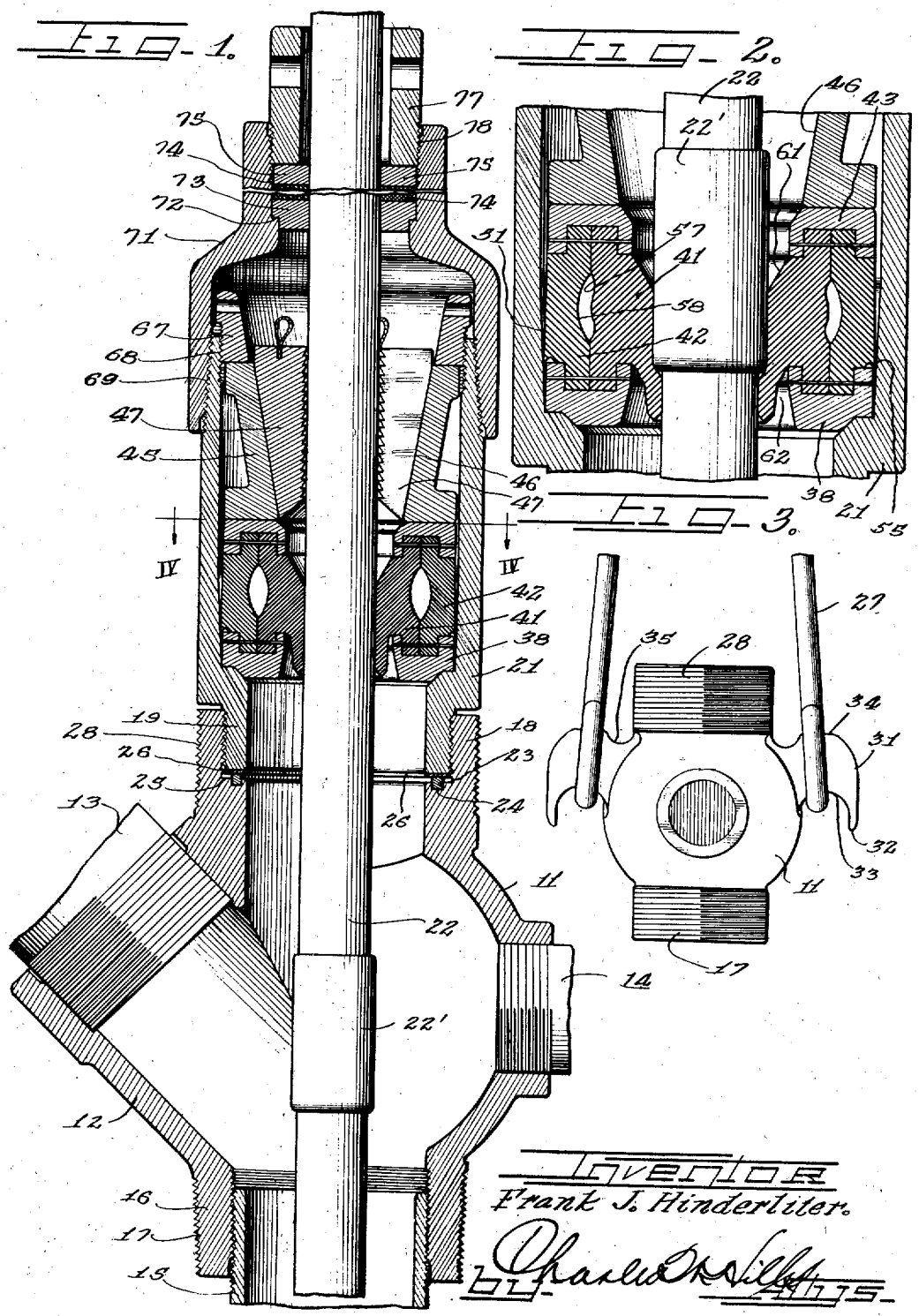

Jan. 16, 1934. F. J. HINDERLITER Re. 19,047

CASING HEAD WITH BLOW-OUT PREVENTER

Original Filed March 30, 1932 2 Sheets-Sheet. 2

Inventor
Frank J. Hinderliter.
by Charles O. Wilbur
Atty.

Reissued Jan. 16, 1934 Re. 19,047

UNITED STATES PATENT OFFICE 19,047

CASING HEAD WITH BLOW-OUT PREVENTER

Frank J. Hinderliter, Tulsa, Okla.

Original No. 1,918,810, dated July 18, 1933, Serial No. 601,950, March 30, 1932. Application for reissue October 27, 1933. Serial No. 695,538

34 Claims. (Cl. 166—14)

This invention relates to a casing head and will be described as a casing head incorporating high pressure sealing means therein for preventing the escape of fluid upwardly along the well casing and/or drill pipe which normally extends vertically through the casing head.

An object of this invention is the provision of such a casing head designed to reduce the friction of fluid passing therethrough and to facilitate the positioning of the casing head at a relatively low point.

Another object is the provision of a casing head with an improved packing assembly associated therewith, so designed and arranged that greatly increased pressures will be sustained thereby.

Another object of this invention is the provision of such a casing head with an improved packing assembly and means associated therewith for supporting the weight of a well casing or drill pipe passing through the packing assembly, and means associated therewith for transferring the weight of the well casing or drill pipe to the packing assembly for depressing the packing assembly and causing lateral displacement of a portion of the material thereof to effect a fluid tight high pressure seal through which the drill pipe may be moved vertically in either direction.

Other objects and advantages of this invention will become apparent from the following description with reference to the accompanying drawings.

On the drawings:

Figure 1 is a vertical section of a casing head incorporating my invention.

Figure 2 is a vertical section of a fragment of that shown in Figure 1 showing the packing element somewhat distorted as the collar on the pipe passes therethrough.

Figure 3 is a vertical elevation of the globe portion of the casing head and illustrating the bail ears and fragments of a lifting bail.

As shown on the drawings:

Figure 6:
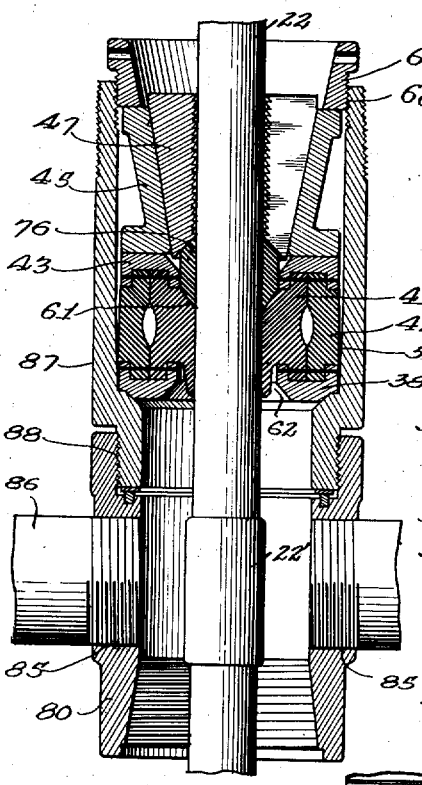
Figure 6 is a vertical section through a modified form of my invention.
Figure 5:
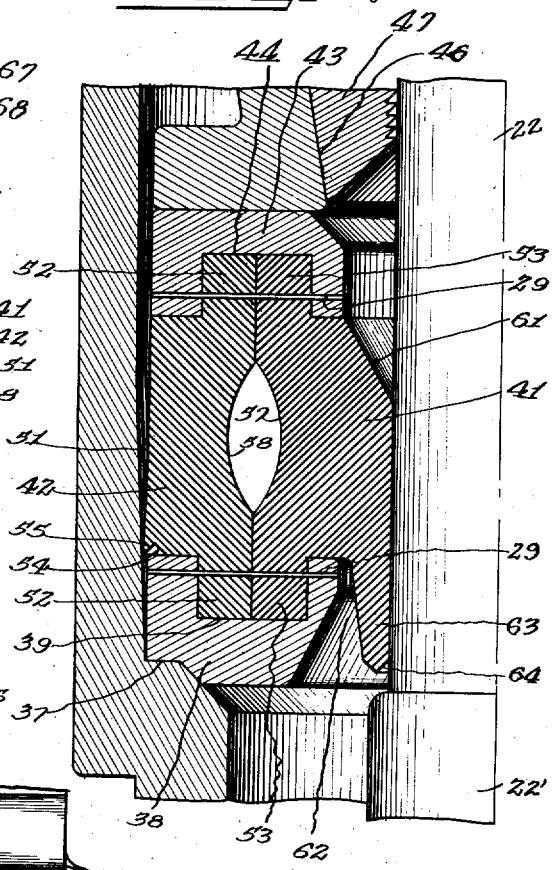
Figure 5 is a greatly enlarged view of a fragment of that shown in Figure 1, illustrating the packing assembly more in detail.
Figure 4:
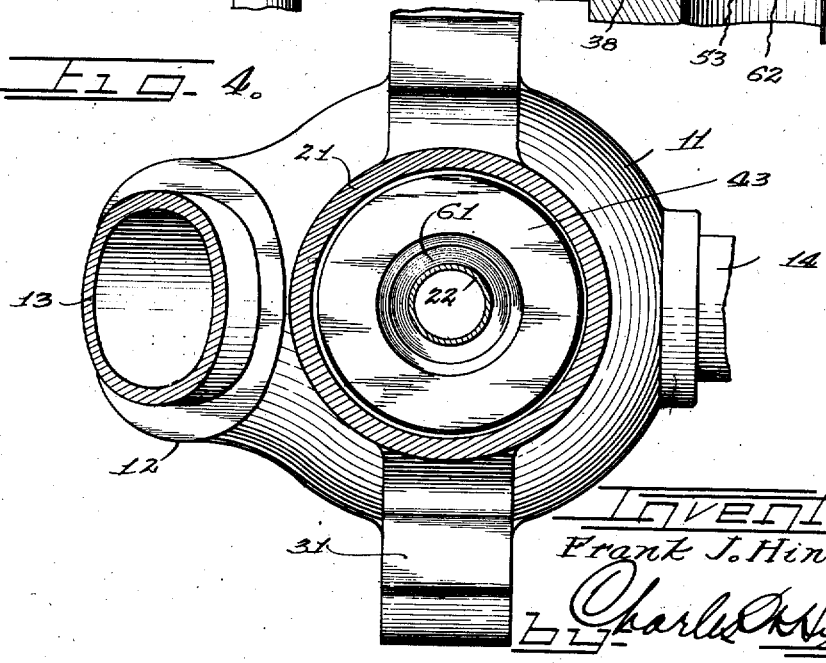
Figure 4 is a horizontal section taken on the line IV—IV of Figure 1.

The preferred form of my invention as illustrated in Figures 1 to 5, inclusive, comprises a casing head including a head or globe portion 11 having a relatively large globular interior and a takeoff 12 on one side of relatively large diameter which forms a Y with the casing. Both of these features cooperate to very materially reduce the friction of fluids in passing through the head and as a result reducing the wear on the parts. The portion 12 is adapted at its outer end for threaded engagement with an inclined pipe 13 for delivering fluid from the head 11 to any desired point. The opposite side of the head member 11 is adapted for threaded engagement with a horizontally extending pipe 14 through which fluid may also be delivered to any desired point. The lower end of the head 11 is adapted for threaded engagement with a casing 15 which extends into a well not shown. The exterior of the boss 16 is provided with casing threads 17 by which the head may be threaded into a casing of larger diameter than that shown in the drawings. The upper side of the head 11 is provided with a boss 18 having threaded engagement with the lower end portion 19 of the vertically disposed extension or bowl member 21 which extension is provided for surrounding the drill pipe 22 which extends vertically therethrough and for supporting the packing assembly. For sealing the boss 19 to the head 11, there is provided a relatively soft ring 23, such as lead, seated in a groove 24 in the face of the shoulder 25. A suitable metallic gasket 26 is interposed between the ring 23 and the lower edge of the boss 19, to form a fluid tight seal therewith and prevent leakage of fluid and loss of pressure at this point. On the outside of the vertically extending boss 18 I have provided threads 28 by which it is possible to make connection with a large pipe when the bowl 21 is not used.

In order to facilitate the movement of the casing head particularly for moving it to or from its position on a well casing, I have provided the same with oppositely disposed laterally extending ears or hook members 31 which extend downwardly to a point 32 and have upwardly curved portions 33 into which suitable lifting means such as elevator bails 27 may be positioned for lifting the head. The tops of the ears 31 are preferably flat at 34 having depressions 35. This specific shape on the top makes it convenient to clamp the head down into position by suitable clamping means engaging over the ears 31 if desired. As such clamping or lifting means per se constitutes no part of this invention, the same have not been illustrated in the drawings, but is is believed that the utility of the lifting ears as herein described will be readily understood.

The vertical extension or casing head bowl 21 is provided with an annular shoulder 37 on which is seated the packing assembly consisting of a metal ring 38 having a channel 39 in its upper surface in which is seated the inner and outer rubber annular sealing members 41 and 42, respectively. An upper metal ring 43 having a downwardly disposed channel 44 is fitted on the upper edges of the packing members 41 and 42.

Seated upon the metal ring 43 is a bushing 45 having a tapered or frusto-conical shaped inner cam surface 46 being larger in diameter adjacent the top. On the cam surface 46 may be positioned the slips or wedges 47 which engage the pipe 22 and are adapted to hold the weight thereof. The weight of the pipe 22 being supported by the wedges 47 is transferred to the bushing 45 and to the metal ring 43 which depresses the rubber packing members 41 and 42, displacing portions of the rubber thereof laterally to form a fluid tight seal between the pipe 22 and the inner surface of the extension or bowl 21.

The lower portion of the inner surface of the extension 21 is slightly tapered downwardly and inwardly to the shoulder 37 such that when the outer rubber sealing member 42 is pressed into position from above, the lower edge of the sealing member 42 is crowded against the tapered inner surface 51 which facilitates the forming of a tight seal at this point. The sealing members 41 and 42 have annular ridges 52 and 53 thereon which fit within the channel portions of the rings 38 and 43. The lower edge of the outer packing member 42 is provided with a groove 54, preferably of V shape adjacent the outer edge in a position to provide a relatively sharp downwardly extending flange 55 which extends slightly beyond the outer edge of the ring 38 and into firm engagement with the surface 51 of the extension 21 to form therewith a fluid tight and relatively high pressure seal. The packing assembly is preferably held together by suitable pins 29 passing through the rings 38 and 43 and through the annular ridges 52 and 53 on the packing elements.

The co-engaging surfaces of the rubber packing members 41 and 42 are provided with opposed grooves 57 and 58 which provide space for the displacement of rubber thereinto when a drill pipe 22 is inserted through the packing assembly together with a collar 22′ thereon as shown in Figure 2.

The inner packing element 41 is provided with a beveled upper corner 61 to facilitate the downward movement of the drill pipe therethrough. The lower surface of the packing member 41 is provided with a pocket 62 into which fluid under high pressure may pass to firmly press the depending flange 63 on the inner lower edge of the member 41 into firm engagement with the pipe 22. The lower edge of the flange 63 has a beveled edge 64 forming in effect an outward flaring of the flange 63 at the lower edge to facilitate the upward movement of the pipe 22 therethrough together with the collar 22′ thereon.

Above the loose bushing 45 and resting on the same is an adjustable bushing 67 having threaded engagement at 68 with interior threads on the upper end of the extension or bowl 21. The upper end of extension 21 is provided with external threads having engagement at 69 with internal threads on the packing gland casing 71. The casing 71 is provided with a shoulder 72 on which is seated a ring 73 for holding a packing gland seal 74. On the top of the seal 74 is seated a ring 75 on which is seated adjustable packing gland nut 77 having threaded engagement at 78 with internal threads on the upper end of the casing 71. The nut 77 may be split if desired so that it may be readily placed in position without passing it over the end of the pipe.

In Figure 2 is more particularly illustrated the method of raising and lowering a pipe in a well by passing it longitudinally through the casing head and simultaneously maintaining a radial force of the packing member 41 against the pipe 22 so that a fluid-tight seal is maintained even when the collar 22′ is passing through the packing. This result is accomplished particularly because of the opposed grooves 57 and 58 in the packing element permitting the displacement therein of material of the packing element as the collar 22′ passes through the assembly as shown in Figure 2. This result is also aided by the depending flange 63 on the packing element 41, which flange is adapted to expand and contract by reason of its inherent resiliency and by reason of the specific form thereof which provides a pocket 62 around the flange 63 for receiving fluid under pressure to firmly hold the flange 63 against the pipe 22 and the collar 22′ as it passes therethrough.

In the modification of my invention shown in Figure 6, the casing head 80 is of substantially cylindrical form having radial openings 85 on opposite sides in which are threaded radially extending pipes 86 for delivering fluid from the interior of the head to any suitable point of delivery. In this form of my invention, the vertically extending bowl 87 has threaded engagement with the upper end of the casing head at 88. The inner packing member 41 is provided with a pocket 62 and the depending flange on the lower inner edge is adapted for engagement with the pipe 22 to form a seal therewith as described with reference to Figure 5. The upper corner of the member 41 is beveled at 84 to facilitate the downward movement of a pipe therethrough. Upon the upper beveled corner 61 of the packing 41 is seated an auxiliary packing ring 76 which engages the lower ends of the wedges 47 to hold the auxiliary packing in place.

It is thought that my novel method of raising and lowering pipe in a well whereby a seal is continuously maintained about the pipe at the upper extremity of the well during such process of raising and/or lowering pipe will be fully understood from the above description of an apparatus by which the method may be practiced.

The advantages of my invention have already become well known in the oil field. In the first place the invention has proven to be a decidedly important one in that it affords a solution to the problem of oil well operators with regard to the holding of the fluid pressures in the well so that sudden outbursts of fluid, such as gas, salt water, oil, etc., will not result in damage to the surrounding property and land. For example, if in the drilling of the well a salt water formation should be reached and salt water should suddenly be forcibly moved upwardly through the drill pipe such salt water might be discharged onto the property surrounding the well and thus result in litigation for any damage ensuing as a result of the spraying of that land with the salt water. Such salt water is not only detrimental to the crops but quite frequently results in the death of livestock which may have drunk such water. Much the same conditions would ensue as the result of the discharge of other fluids into the atmosphere and territory surrounding the well being operated.

Heretofore it has been exceedingly difficult to harness such sudden outburts of fluid. In fact, with the existing heads on the market, it has not been feasible to satisfactorily arrest and pack off such sudden outbursts. This has been due to the fact that oftentimes the rush of fluid has been so sudden as to occur before the operator could introduce into the head any means for sealing off such fluid pressures. Then, too, once the fluid is being discharged from the well it is very difficult to introduce into the path of the fluid a sealing medium for arresting or controlling its discharge from the well.

The present invention not only affords a solution to that problem but has already met with a great deal of success in the oil field. Through the use of this invention it is possible to at all times have the well under control so that should a sudden outburst of fluid occur the same may be controlled and delivered to suitable receptacles for accommodating the same or discharged in such a manner that it will not in any way injure the surrounding property.

Although I have herein described only two preferred forms of my invention, I am aware that many changes may be made and numerous details of construction may be varied through a wide range without departing from the principle of this invention, and I therefore do not desire that the patent to be granted hereon shall be limited otherwise than necessitated by the prior art.

I claim as my invention:

1. In a casing head, a vertically disposed extension thereon for surrounding a pipe passing therethrough, supporting means in said extension, a packing assembly on said supporting means, said packing assembly comprising an annular resilient packing element disposed for engagement with the pipe and including a depending skirt portion on its inner edge, and means for urging downwardly on said packing assembly to depress the same and form a high pressure seal between the pipe and said extension.

2. In a casing head, a vertically disposed extension thereon for surrounding a pipe passing therethrough, supporting means in said extension, a packing assembly on said supporting means, said packing assembly comprising an annular packing element disposed to surround the pipe, and including a flexible depending flange on the inner edge for engagement with the pipe, and means for urging downwardly on said packing assembly to depress the same and form a high pressure seal between the pipe and said extension.

3. In a casing head, a vertically disposed extension thereof for surrounding a pipe passing therethrough, supporting means in said extension, a packing assembly on said supporting means, said packing assembly comprising an annular packing element disposed to surround the pipe, said element having a groove in its lower edge providing an annular pocket spaced from the inner edge, and a depending flange on the inner edge of said packing element to increase the pressure resistance of the packing, and means for urging downwardly on said packing assembly to depress the same and form a high pressure seal between the pipe and said extension.

4. In a casing head, a vertically disposed extension thereon for surrounding a pipe passing therethrough, supporting means in said extension, a packing assembly on said supporting means, said packing assembly comprising an annular packing element disposed to surround the pipe, said element having a groove in its lower edge providing an annular pocket spaced from the inner edge, and a depending flange on the inner edge of said packing element to increase the pressure resistance of the packing, and means for urging downwardly on said packing assembly to depress the same and form a high pressure seal between the pipe and said extension, said packing assembly including a second packing element disposed between the first said packing element and said extension.

5. In a casing head, a vertically disposed extension thereon for surrounding a pipe passing therethrough, supporting means in said extension, a packing assembly on said supporting means, said packing assembly comprising an annular resilient packing element disposed for engagement with the pipe and including a depending skirt portion on its inner edge, and means for urging downwardly on said packing assembly to depress the same and form a high pressure seal between the pipe and said extension, said packing assembly including a second packing element disposed between the first said packing element and said extension.

6. In a casing head, a vertically disposed extension thereon for surrounding a pipe passing therethrough, supporting means in said extension, a packing assembly on said supporting means, said packing assembly comprising an annular packing element disposed to surround the drill pipe, and including a flexible depending flange on the inner edge for engagement with the pipe, and means for urging downwardly on said packing assembly to depress the same and form a high pressure seal between the pipe and said extension, said packing assembly including a second packing element disposed between the first said packing element and said extension.

7. In a casing head, a vertically disposed extension thereon for surrounding a pipe passing therethrough, supporting means in said extension, a packing assembly on said supporting means, said packing assembly comprising a packing element with its outer edge engaging the inner surface of said extension, said extension having its inner surface tapered upwardly and outwardly away from said packing element, and means for urging downwardly on said packing element to depress the same and to form a high pressure seal between the pipe and said extension.

8. In a casing head, a vertically disposed extension thereon for surrounding a pipe passing therethrough, supporting means in said extension, a packing assembly on said supporting means, and means for urging downwardly on said packing assembly to depress the same and form a high pressure seal between the pipe and said extension, said packing assembly comprising a packing element with the lower edge of its outer surface engaging the inner surface of said extension, said packing element having a groove in its lower surface providing a flange at the outer edge engaging said extension.

9. In a casing head, a vertically disposed extension thereon for surrounding a pipe passing therethrough, supporting means on said extension, a packing assembly on said supporting means, and means supported by said packing assembly, adapted to hold the weight of the pipe for compressing the packing and forming a high pressure seal, said packing assembly comprising a packing element with the lower edge of its outer surface engaging the inner surface of said extension, said packing element having a groove in its lower surface providing a flange at the outer edge engaging said extension.

10. In a casing head, a vertically disposed extension thereon for surrounding a pipe passing therethrough, supporting means on said extension, a packing assembly on said supporting means, and means supported by said packing assembly, adapted to hold the weight of the pipe for compressing the packing and forming a high pressure seal, said packing assembly comprising an annular resilient packing element disposed for engagement with the pipe and including a depending skirt portion on its lower edge.

11. In a casing head, a vertically disposed extension thereon for surrounding a pipe passing therethrough, supporting means on said extension, a packing assembly on said supporting means, and means supported by said packing assembly, adapted to hold the weight of the pipe for compressing the packing and forming a high pressure seal, said packing assembly comprising an annular packing element disposed to surround the pipe, and including a flexible depending flange on the inner edge for engagement with the pipe.

12. In a casing head, a vertically disposed extension thereon for surrounding a pipe passing therethrough, supporting means in said extension, a packing assembly on said supporting means, and means for urging downwardly on said packing assembly to depress the same and form a high pressure seal between the pipe and said extension, said packing assembly comprising a packing element with the lower edge of its outer surface engaging the inner surface of said extension, said packing element having an annular V-shaped groove in its lower edge near the outer edge, providing a depending flange at the outer edge, engaging said extension, said extension having its inner surface tapered inwardly and downwardly where engaged by said packing element.

13. In a casing head, a vertically disposed extension thereon for surrounding a pipe passing therethrough, supporting means in said extension, a packing assembly on said supporting means, and means for urging downwardly on said packing assembly to depress the same and form a high pressure seal between the pipe and said extension, said packing assembly comprising an annular packing element disposed about the pipe, and including a flexible depending flange on the inner edge for engagement with the pipe, the lower extremity of said flange being flared outwardly to permit the withdrawal therethrough of a pipe having a collar thereon.

14. In a device of the class described, a casing head, a vertically disposed extension thereon, to surround a pipe passing through said head and into a well, supporting means in said extension, a packing assembly seated on said supporting means and including a lower packing ring, an inner rubber packing element on said ring for engagement with the pipe comprising a depending flange on the inner edge flared outwardly at the bottom, a second rubber packing element interposed between and engaging the first said packing element, and said extension, the second said packing element including an annular packing flange on its lower outer edge engaging the inner surface of said extension, and means for urging downwardly on said packing element to cause a lateral displacement of the rubber to form a high pressure fluid tight seal between the pipe and said extension.

15. In a device of the class described, a casing head, a vertically disposed extension thereon, to surround a pipe passing through said head and into a well, supporting means in said extension, a packing assembly seated on said supporting means and including a lower packing ring, an inner rubber packing element on said ring for engagement with the pipe, comprising a depending flange on the inner edge flared outwardly at the bottom, a second rubber packing element interposed between and engaging the first said packing element, and said extension, the second said packing element including an annular packing flange on its lower outer edge engaging the inner surface of said extension, and means for urging downwardly on said packing element to cause a lateral displacement of the rubber to form a high pressure fluid tight seal between the pipe and said extension, said head having a large internal diameter and including a slanting lateral takeoff of large diameter to reduce friction in the head, and permit relatively low positioning of said head on a well casing.

16. In a device of the class described, a casing head, a vertically disposed extension thereon, to surround a pipe passing through said head and into a well, supporting means in said extension, a packing assembly seated on said supporting means and including a lower packing ring, an inner rubber packing element on said ring for engagement with the pipe, comprising a depending flange on the inner edge flared outwardly at the bottom, a second rubber packing element interposed between and engaging the first said packing element, and said extension, the second said packing element including an annular packing flange on its lower outer edge engaging the inner surface of said extension, the first said packing element having its upper inner edge beveled to facilitate downward movement of a pipe therethrough, an upper packing ring seated on and embracing portions of the upper edge of said packing element, and means supported by said upper ring adapted to hold the weight of the pipe to depress the packing element and form a high pressure seal between the pipe and said extension.

17. In a device of the class described, a casing head, a vertically disposed extension thereon, to surround a pipe passing through said head and into a well, supporting means in said extension, a packing assembly seated on said supporting means and including a lower packing ring, an inner rubber packing element on said ring for engagement with the pipe, comprising a depending flange on the inner edge flared outwardly at the bottom, a second rubber packing element interposed between and engaging the first said packing element, and said extension, the second said packing element including an annular packing flange on its lower outer edge engaging the inner surface of said extension, the first said packing element having its upper inner edge beveled to facilitate downward movement of a pipe therethrough, an upper packing ring seated on and embracing portions of the upper edge of said packing element, and means supported by said upper ring adapted to hold the weight of the pipe to depress the packing element and form a high pressure seal between the pipe and said extension, an auxiliary resilient sealing ring disposed between said upper ring and the pipe, and engaging the first said sealing member on its beveled edge.

18. In a device of the class described, a casing head, a vertically disposed extension thereon, to surround a pipe passing through said head and into a well, supporting means in said extension, a packing assembly seated on said supporting means and including a lower packing ring, an inner rubber packing element on said ring for engagement with the pipe, comprising a depending flange on the inner edge flared outwardly at the bottom, a second rubber packing element interposed between and engaging the first said packing element, and said extension, the second said packing element including an annular packing flange on its lower outer edge engaging the inner surface of said extension, the first said packing element having its upper inner edge beveled to facilitate downward movement of a pipe therethrough, an upper packing ring seated on and embracing portions of the upper edge of said packing element, and means supported by said upper ring adapted to hold the weight of the pipe to depress the packing element and form a high pressure seal between the pipe and said extension, said packing elements having opposed grooves on their co-engaging surfaces to provide space for the displacement of rubber when a collar on a pipe is passed through the packing assembly.

19. As an article of manufacture, a casing head having a hollow globular body, oppositely disposed fluid discharge openings and lateral lifting ears connected to said body between and at an angle to said openings and formed for connection to elevating bails.

20. Sealing means for use in well-drilling apparatus including a pair of complementary and concentric flexible rings defining a ring like pocket between them to provide for internal displacement of the material of said rings when they are subjected to pressure.

21. Sealing means for use with a casing head and the like including a pair of complementary and concentric flexible rings defining a ring like pocket between them to provide for internal displacement of the material of said rings when they are subjected to pressure, and a lateral depending skirt portion on each of said rings for enhancing the sealing effect of said rings when they are in use.

22. In a casing head, sealing means for disposition around pipe extending through said head and comprising a ring having its internal surface radially urged into engagement with said pipe and formed to yield radially from and toward the pipe as the pipe and its couplings are passed through the casing head so as to continuously maintain a fluid tight seal about the pipe said ring having an outer marginal portion formed to be distorted laterally and outwardly when subjected to pressure, into sealing engagement with the adjoining wall of the casing head and means for exerting a downward pressure on said sealing means to force it into effective sealing position.

23. In a casing head, sealing means for disposition around pipe extending through said head and comprising a ring having its internal surface radially urged into engagement with said pipe and formed with an enclosed internal cavity so as to yield radially from and toward the pipe as the pipe and its couplings are passed through the casing head so as to continuously maintain a fluid tight seal about the pipe, and means for suspending the weight of said pipe on said ring.

24. Sealing means for use in well drilling apparatus including a pair of complementary and concentric flexible rings defining a ring like pocket between them to provide for internal displacement of the material of said rings when they are subjected to pressure, and a downwardly depending skirt portion on the inner ring for enhancing the sealing effect of said rings when they are in use.

25. Sealing means for use with a casing head including a pair of complementary and concentric flexible rings defining a ring like pocket between them to provide for internal displacement of the material of said rings when they are subjected to pressure, the outer of said rings having a circular groove in its lower end positioned to be exposed to fluid pressure so as to aid in forming a seal between said outer ring and casing head.

26. In a casing head, sealing means for disposition around pipe extending through said casing head and comprising a ring having its internal surface radially urged into engagement with said pipe and formed hollow to yield internally and radially from and toward the pipe as the pipe and its couplings are passed through the casing head so as to continuously maintain a fluid tight seal about the pipe and means for exerting a downward pressure on said sealing means to force it into effective sealing position.

27. In a casing head, a blowout preventer comprising an annular packer sleeve for disposition around and in sealing engagement with pipe extending through the head and having upper and lower edges spaced from the pipe and held in relatively fixed positions, said sleeve having an annular inner projection for sealing contact with the pipe and which projection is offset downwardly relative to said edges so as to provide an annular downwardly depending skirt for enhancing the sealing effect of said packer sleeve, whereby a fluid tight seal is continuously maintained about the pipe.

28. In a casing head, a blowout preventer comprising an annular packer sleeve for disposition around and in sealing engagement with pipe extending through the head and having upper and lower edges spaced from the pipe and held in relatively fixed positions, said sleeve having an annular inner projection for sealing contact with the pipe and which projection is offset downwardly relative to said edges so as to provide an annular downwardly depending skirt for enhancing the sealing effect of said packer sleeve, said sleeve having its outer annular surface formed of concave curved cross section so as to afford space for the radial displacement of the sleeve as the couplings of the pipe are passed through the sleeve whereby a fluid tight seal is continuously maintained about the pipe.

29. In a casing head, a blowout preventer comprising an annular packer sleeve for disposition around and in sealing engagement with the pipe extending through the head and having upper and lower spaced packer sleeve retaining rings which have opposite annular pockets for receiving and holding said upper and lower edges of the sleeve in relatively fixed positions, said sleeve having an inner and downwardly projecting annular portion for contacting said pipe and which portion is offset downwardly relative to said edges of said ring for enhancing the sealing effect of the packer sleeve when in use.

30. In a casing head, a blowout preventer comprising an annular packer sleeve for disposition around and in sealing engagement with the pipe extending through the head and having upper and lower spaced packer sleeve retaining rings which have opposite annular pockets for receiving and holding said upper and lower edges of the sleeve in relatively fixed positions, said sleeve having an inner and downwardly projecting annular portion for contacting said pipe and which portion is offset downwardly relative to said edges of said ring for enhancing the sealing effect of the packer sleeve when in use, said sleeve having its outer annular surface formed of concave cross section so as to afford space for the radial displacement of the sleeve as the couplings are passed through the sleeve whereby a fluid tight seal is continuously maintained about the pipe.

31. In a casing head, sealing means comprising an annular packing sleeve for disposition around and in sealing engagement with pipe extending through the head and having upper and lower spaced annular flanges and an intermediate annular extension projecting from between said flanges and offset downwardly for contact with the pipe, and means for accommodating and holding said annular flanges in properly spaced position in the casing head.

32. In a casing head, a sealing means comprising a continuous annular packer ring for disposition around pipe extending through said head and having an inner unbroken cylindrical surface radially urged into engagement with said pipe and formed to yield radially from and toward the pipe as the pipe and its couplings are passed through the casing head to continuously maintain a fluid tight seal about the pipe, and means for subjecting the ring to endwise compressive force for disposing the ring in effective sealing position.

33. In a casing head, a sealing means comprising a continuous annular packer ring for disposition around pipe extending through said head and having an inner unbroken cylindrical surface radially urged into engagement with said pipe and formed to yield radially from and toward the pipe as the pipe and its couplings are passed through the casing head to continuously maintain a fluid tight seal about the pipe, an adapter ring in said head above said sealing means formed to accommodate slips for anchoring the pipe to said head, and means for subjecting the packer ring to an endwise compressive force.

34. In a casing head, a sealing means comprising a continuous annular packer ring for disposition around pipe extending through said head and having an inner unbroken cylindrical surface radially urged into engagement with said pipe and formed to yield radially from and toward the pipe as the pipe and its couplings are passed through the casing head to continuously maintain a fluid tight seal about the pipe, said ring having its outer surface formed concave to allow for the displacement of the ring by the pipe couplings as they pass through the sealing means.

FRANK J. HINDERLITER.